United States Patent [19]

Ogasawara

[11] Patent Number: 4,865,040
[45] Date of Patent: Sep. 12, 1989

[54] ULTRASONIC IMAGE RECORDING METHOD AND SYSTEM

[75] Inventor: Tatsuo Ogasawara, Tochigi, Japan

[73] Assignee: Kabushiki Kaisha Toshiba, Kawasaki, Japan

[21] Appl. No.: 309,930

[22] Filed: Feb. 13, 1989

Related U.S. Application Data

[63] Continuation of Ser. No. 89,759, Aug. 27, 1987, abandoned.

[30] Foreign Application Priority Data

Sep. 2, 1986 [JP] Japan .................................. 61-205081

[51] Int. Cl.⁴ .............................................. A61B 8/00
[52] U.S. Cl. ............................. 128/661.04; 128/660.01
[58] Field of Search ..................... 73/861.25, 861.26; 128/661.01, 660.01, 661.04

[56] References Cited

U.S. PATENT DOCUMENTS

| | | | |
|---|---|---|---|
| 4,176,658 | 12/1979 | Kossoff et al. | 128/660 |
| 4,213,147 | 7/1980 | Von Buenau | 358/112 |
| 4,398,540 | 8/1983 | Takemura et al. | 128/660 |
| 4,413,630 | 11/1983 | Anderson et al. | 128/661 |
| 4,417,582 | 11/1983 | Trimmer et al. | 128/660 |
| 4,423,737 | 1/1984 | Yano et al. | 128/661 |
| 4,567,768 | 2/1986 | Satoh et al. | 73/606 |
| 4,614,196 | 9/1986 | Sato | 128/660 |

OTHER PUBLICATIONS

A Computer-Aided Three Dimensional Display System for Ultrasonic Diagnosis of a Breast Tumor, Ultrasonics (Nov. 1979), vol. 17, No. 6, pp. 261-268.

Primary Examiner—Francis J. Jaworski
Assistant Examiner—George Manuel
Attorney, Agent, or Firm—Finnegan, Henderson, Farabow, Garrett & Dunner

[57] ABSTRACT

An ultrasonic reception signal from a subject being examined is detected by use of an ultrasonic image recording system. Of the ultrasonic images obtained by means of image processing, only image data required for display purposes is recorded in the system. Through the simultaneous superimposition of recorded ultrasonic image data and ultrasonic scanning condition data on a superimposing circuit, these two data are recorded on the same recording area at a line scan recorder.

5 Claims, 4 Drawing Sheets

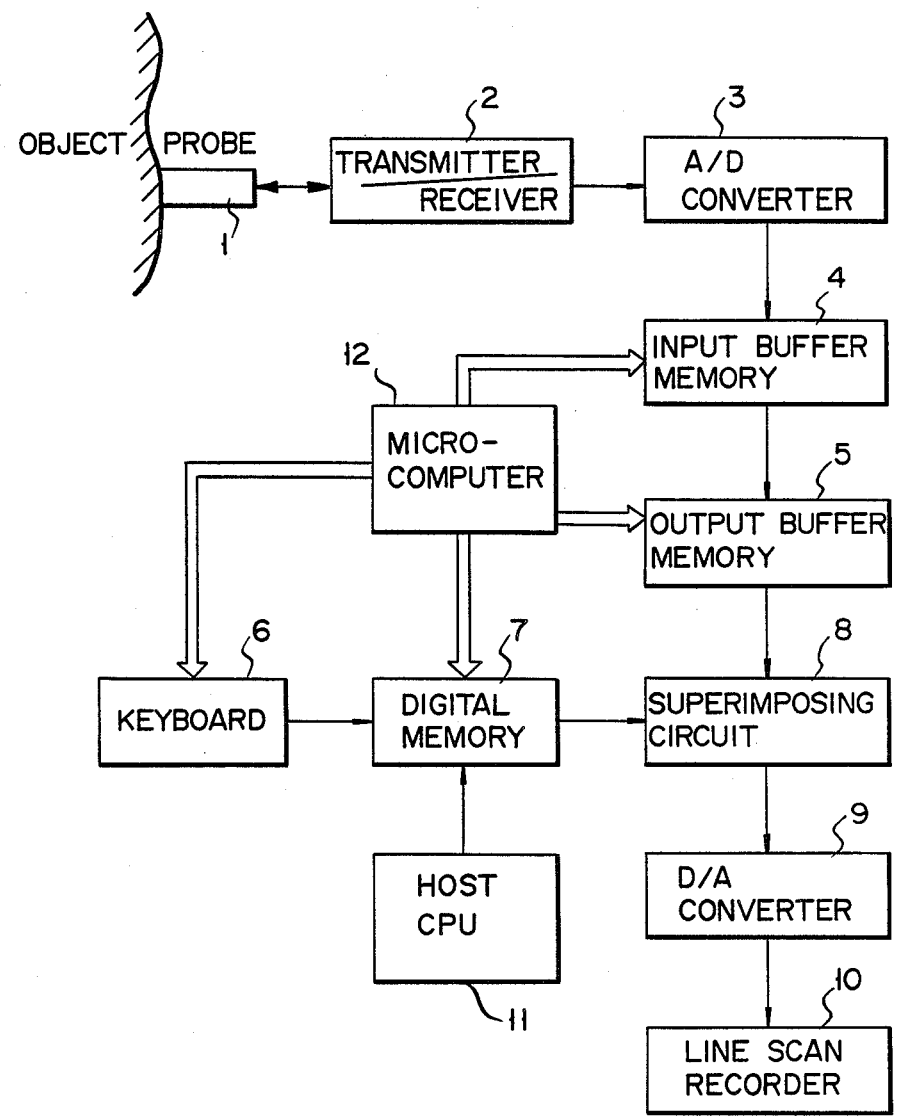
F I G. 2

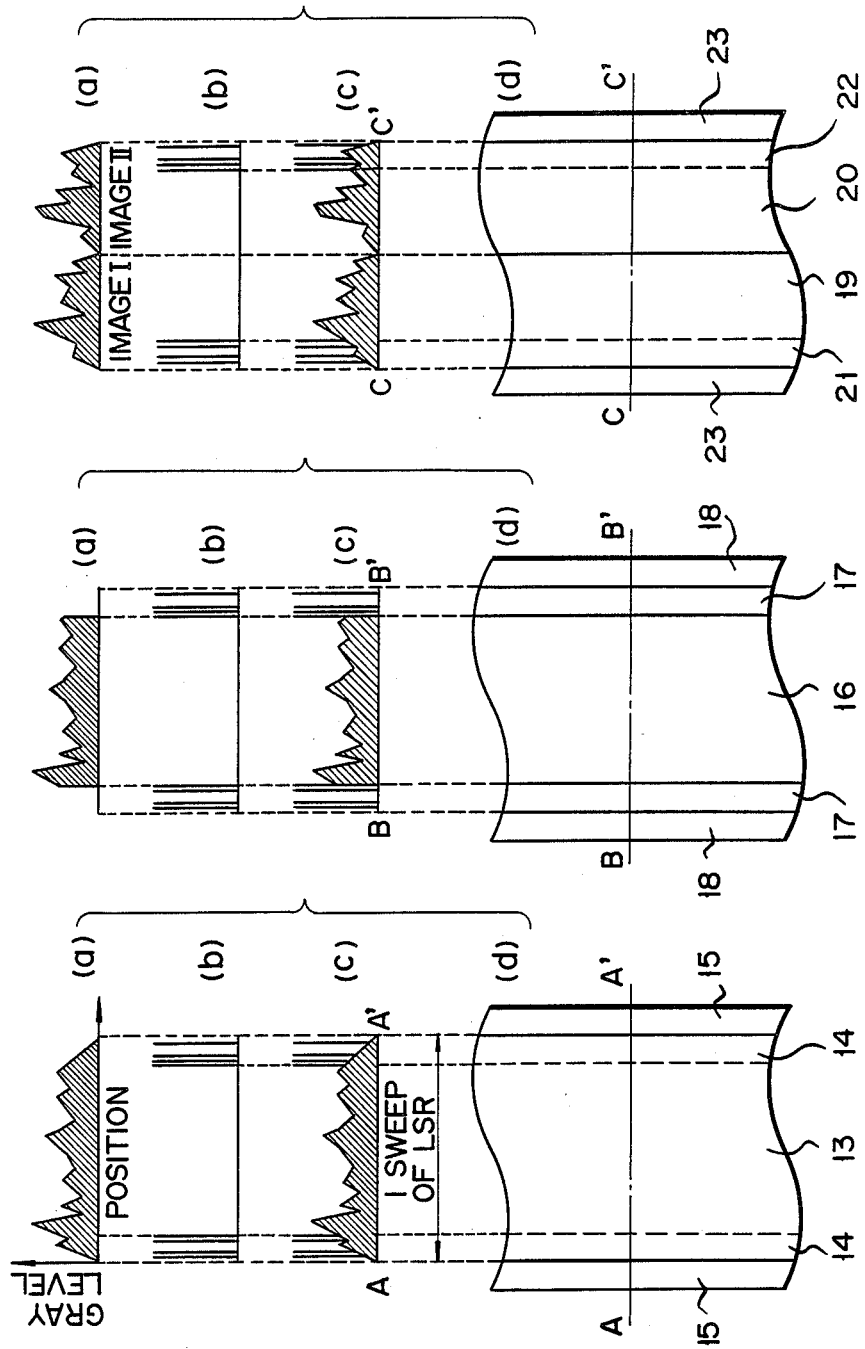

ULTRASONIC IMAGE RECORDING METHOD AND SYSTEM

This application is a continuation of application Ser. No. 089,759, filed Aug. 27, 1987, now abandoned.

BACKGROUND OF THE INVENTION

This invention relates to an ultrasonic image recording method and system for recording, together with an ultrasonic image obtained through processing an ultrasonic reception signal from, for example, the living tissue of a subject, and associated ultrasonic scanning condition data, on a common recording sheet.

In order to preserve an ultrasonic image of a region of interest (ROI) of a subject, obtained by use of an ultrasonic image system, an ultrasonic image, as well as the ultrasonic condition data associated therewith, is recorded in a time sequence on a common recording sheet. FIG. 1 shows one format of such a recording sheet. Recording sheet 26 is a length of a continuous sheet and is fed in the recording system in a predetermined direction. Ultrasonic images 24a, 24b, . . . such as a B mode image, an M mode image, or a Doppler mode image, are recorded on most of the recording sheet, and ultrasonic scanning conditions 25a, 25b, . . . , associated with the ultrasonic images, are recorded on the recording area, in a longitudinal, direction, with each ultrasonic image being set adjacent to an ultrasonic scanning condition area, so as to obtain ultrasonic images, in combination with the aforementioned condition areas. Ultrasonic images 24a, 24b, . . . and ultrasonic scanning condition data 25a, 25b, . . . are sequentially recorded by a line-scan recorder (hereinafter referred to as LSR) on a common recording sheet, noting that the length of one ultrasonic image, for example, 24a, is usually of the order of a few meters.

Of the ultrasonic images recorded on a relatively long sheet, only a portion, in the order of, for example, 30 cm is usually required for actual use. If the ultrasonic scanning condition is altered during part of the recording, no ready matching can be obtained between the ultrasonic image and the ultrasonic scanning condition data. Furthermore, it is sometimes necessary that a required ultrasonic image portion be preserved together with the corresponding ultrasonic scanning condition areas 25a, 25b. It is also difficult to obtain a time matching of the ultrasonic image area with the associated ultrasonic scanning condition area in the case where the ultrasonic image is simultaneously recorded on a recording sheet and on a video tape recorder (VTR).

Where, in the conventional ultrasonic image system, the ultrasonic image and ultrasonic scanning condition data are to be recorded on the same recording sheet, the recording data are sequentially recorded in a different area, and it is therefore difficult to fully utilize them for data analysis. It is particularly important that the ultrasonic image and ultrasonic scanning condition data be recorded on the same recording area.

SUMMARY OF THE INVENTION

It is accordingly the object of this invention to provide an ultrasonic image recording method and system which can superimpose ultrasonic image data, obtained through processing an ultrasonic reception signal from a subject of examination, such as a living person, and ultrasonic scanning condition data one over the other to record these data on the same recording sheet.

The present invention provides an ultrasonic image recording method which comprises the steps of:

(a) detecting an ultrasonic reception signal from a subject to being examined;

(b) subjecting the ultrasonic signal to image processing and recording an ultrasonic image thus obtained;

(c) obtaining image data necessary for display, which is derived from the recorded ultrasonic image;

(d) storing, in a digital memory, ultrasonic scanning condition data which is given when said ultrasonic image is obtained;

(e) setting the recorded ultrasonic scanning condition data at a designated position on the ultrasonic image;

(f) simultaneously superimposing the ultrasonic scanning condition data and ultrasonic image data one over the other; and (g) recording the superimposed ultrasonic image data and ultrasonic scanning condition data on the same recording sheet, so as to make most effective that use of recording area.

The present invention additionally provides an ultrasonic image recording system which comprises:

a unit for detecting an ultrasonic reception signal from a subject being examined;

a unit for subjecting the ultrasonic signal to image processing and recording an ultrasonic image thus obtained;

a unit for obtaining setting image data necessary for display, which is derived from the recorded ultrasonic image;

a unit for storing, in a digital memory, the ultrasonic scanning condition data which is given when the ultrasonic image is obtained;

a unit for setting the recorded ultrasonic scanning condition data at an designated position on the ultrasonic image;

a unit for simultaneously superimposing the ultrasonic scanning condition data and ultrasonic image data one over the other; and a unit for recording the superimposed ultrasonic image data and ultrasonic scanning condition data on the same recording sheet, so as to make most effective use of that recording area.

BRIEF DESCRIPTION OF THE DRAWINGS

FIG. 2 is a block diagram generally showing a whole arrangement of an ultrasonic image recording system according to the embodiment of this invention;

FIGS. 4 to 6 each show a process for superimposing an ultrasonic image and ultrasonic scanning condition data and one format of a recording sheet representing a result of that superimposition.

DETAILED DESCRIPTION OF THE PREFERRED EMBODIMENT

Figure 1:
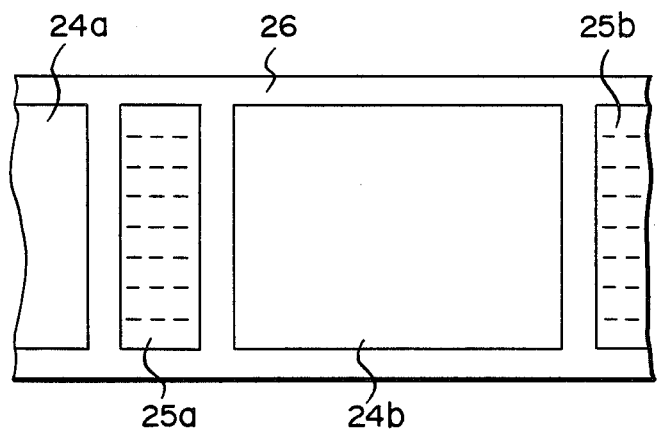
FIG. 1 is one form of a conventional format of a recording sheet.

A system according to one embodiment of this invention will be explained below with reference to the accompanying drawings.

FIG. 2 is a block diagram showing the arrangement of an ultrasonic image recording system for carrying out this invention. In the arrangement shown in FIG. 2, a high frequency signal from transmitter/receiver 2

(hereinafter referred to as (T/R) is applied to a piezoelectric transducer in probe 1 and an ultrasonic signal whose frequency corresponds to the resonant frequency of the piezoelectric transducer is emitted from probe 1. This ultrasonic signal propagates into an object and is echoed back on a boundary of the object which has a different impedance. The echoed-back signal is sent to T/R2 after it has been converted by probe 1 to electric signal. The electric signal of T/R2 is supplied to analog/digital (A/D) converter 3 where it is converted to digital data. The digital data is supplied to input buffer memory 4 where it is stored as ultrasonic image data. The recording sheet area on which the ultrasonic image is recorded can be controlled by microcomputer 12. Of that ultrasonic image stored in input buffer memory 4, only the image data necessary for display is recorded in output buffer memory 5.

Figure 3:
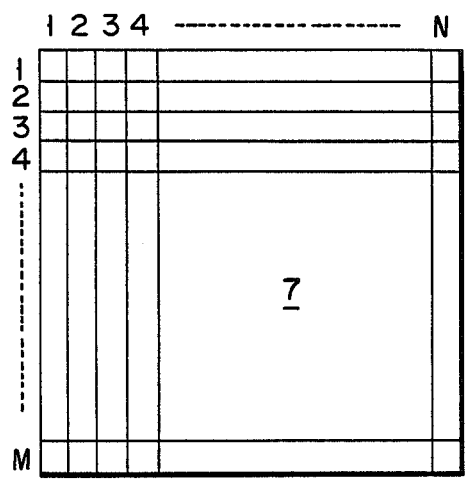
FIG. 3 shows a digital memory having a matrix-like recording area of an ultrasonic image recording system.

On the other hand, ultrasonic scanning condition data is initially input from keyboard 6 or is set by host CPU 11 and recorded in digital memory 7. Digital memory 7 includes an M rows×N columns matrix-like memory array as shown in FIG. 3. For example, 256 or 512 are selected as the M×N number of the memory areas, which may be varied as required. Since the recording area of the ultrasonic scanning condition area is set along the length of the recording sheet, a relation M>N is adopted according to this invention.

Superimposing circuit 8 is adapted to superimpose the ultrasonic display, onto stored in output buffer memory 5 for display, onto the ultrasonic scanning condition data which is stored in digital memory 7. The superimposing timing is controlled by microcomputer 12, and the ultrasonic image data and ultrasonic scanning condition data superimposed one over the other by superimposing circuit 8 are supplied as an output to digital/analog A/D converter 9. The D/A converted data is supplied to line scan recorder (LSR) 10 to permit it to be recorded on the same recording sheet.

The operation of this embodiment will be explained below.

The ultrasonic image of a region of interest (ROI) of an object and associated ultrasonic scanning condition data as obtained on the ultrasonic image recording system are simultaneously superimposed one over the other by superimposing circuit 8 and the corresponding data is recorded in a time sequential fashion on the recording area of the same recording sheet at LSR 10.

FIGS. 4 to 6 show the process of the superimposition of the ultrasonic image data and associated ultrasonic scanning condition data as well as one format of a recording sheet on which both the data are recorded. FIGS. 4(a) to 4(c) show the process of superimposing ultrasonic scanning condition data 14 on one portion, for example, each edge, of the ultrasonic image 13; FIGS. 5(a) to 5(c) show the process of recording, on recording sheet 18, ultrasonic image 16 with ultrasonic scanning condition data 17 and corresponding ultrasonic image data portion both eliminated; and FIGS. 6(a) to 6(c) show the process of recording superimposed data as set forth below on recording sheet 23, noting that ultrasonic scanning condition data 21 and 22 are superimposed on two ultrasonic images 19 and 20 obtained in two kinds of ultrasonic modes or on the portions of images I and II, such as an M mode image and Dopper mode image. FIGS. 4(d), 5(d), and 6(d) each show a format of a recording sheet on which are recorded the superimposed ultrasonic image data and ultrasonic scanning condition data. In FIG. 4, for example, FIG. 4(a) shows the ultrasonic image data recorded in a position as indicated by A-A' in FIG. 4(d); FIG. 4(b) shows the ultrasonic scanning condition data at area 14 along A-A' in FIG. 4(d); and FIG. (c) shows the result of the superimposition of the ultrasonic image data and ultrasonic scanning condition data along line A-a' in FIG. 4(d), which corresponds to one sweep of LSP. As shown in FIG. 4(a), the ordinate shows the graying level of the data and the abscissa shows the position of one sweep of LSR. The same thing can also apply to FIGS. 5 and 6.

Figure 7:
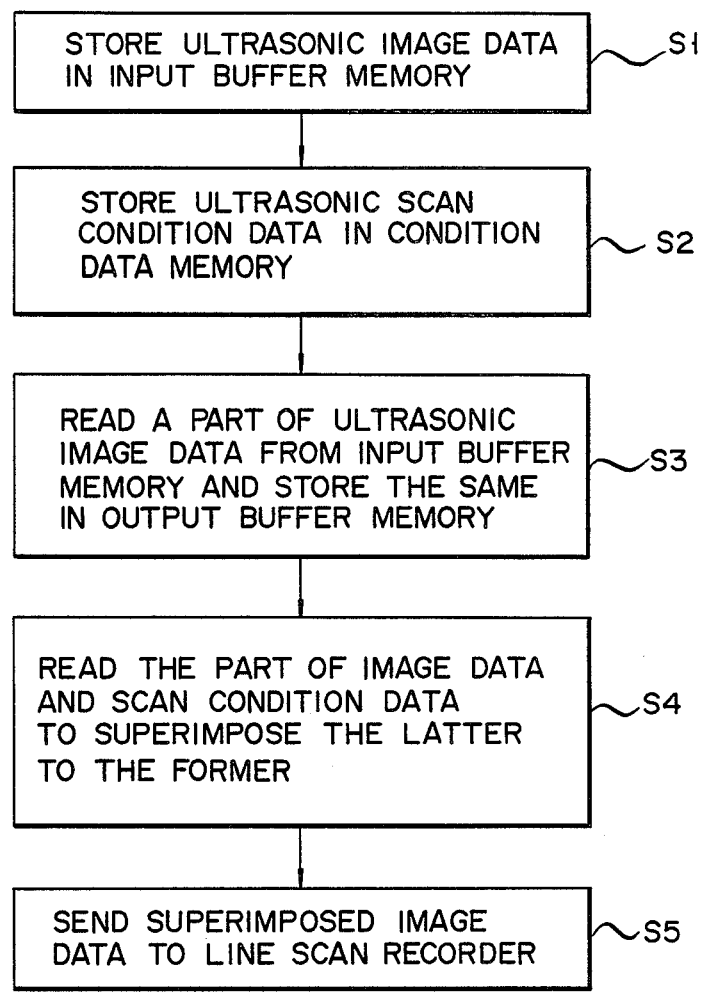
FIG. 7 is a flowchart of for explaining the operation of a microcomputer in the system of FIG. 2.

The function of microcomputer 12 in FIG. 12 will be explained with reference to FIG. 7.

At step S1 digital ultrasonic image data which is output from A/D converter 3 is stored in input buffer memory 4 under control of microcomputer 12.

At step S2 ultrasonic scanning condition data which is obtained from keyboard 6 or host CPU 11 is stored in M×N digital memory 7 under control of microcomputer 12.

The ultrasonic image data which is stored in input buffer memory 4 is recorded over both the recording areas of ultrasonic image 13 and ultrasonic scanning condition data 14 on recording sheet 15. If, under this control, the superimposition of the ultrasonic image is implemented as shown in FIGS. 5(a) to 5(c), then it is necessary that the image data which is recorded at the area of ultrasonic scanning condition area 14 as shown in FIG. 4(a) be cut to leave the data of image area 6 alone as shown in FIGS. 5(a) and 5(c). In the embodiment shown in FIG. 2 the data are stored, in the state shown in FIG. 4(a), in input buffer memory 4 and input buffer memory 4 is addressed so as to read only a zone corresponding to area 16 of FIG. 5(d); by virtue of microcomputer 12 at step S3. The, partial image data thus read out will be as shown in FIG. 5(a) and the output of input buffer memory 4 is supplied to output buffer memory 5 where it is stored.

As step S4 the partial image data, corresponding to one sweep, stored in output buffer memory 5 and ultrasonic scanning condition data of FIG. 5(b), stored in digital memory 7, for example, column data 1 to N (FIG. 3) are read out and sent to superimposing circuit 8 where both the data are superimposed one over the other as shown in FIG. 5(c).

The superimposed image data is sent at step S5 to D/A converter 9 and thence to LSR 10 where the data is on the recording sheet as shown in FIG. 5 (d). It is to be noted that the data of FIG. 5(c) is prepared corresponding to one sweep performed along line B-B' in FIG. 5(d).

Although the ultrasonic scanning condition area has been explained as being cut upon a data shift from input buffer memory 4 to output buffer memory 5, the data of a range shown in FIG. 4(a) may be compressed instead so that they may be contained within area 13 as shown in FIG. 4(d). In this way, the image data of the ultrasonic scanning condition area is recorded on the recording sheet without being cut. A variety of methods may be used for data compression. Within a time period of one sweep performed by LSR10 for area 13, the whole image data of FIG. 4(a) may be read out for data shift from input buffer memory to output buffer memory 5. For this reason it is only necessary to speed up an addressing clock which is supplied from microcomputer 12 to input buffer memory 4 and thence to output buffer memory 5.

According to this invention, therefore, the ultrasonic image and ultrasonic scanning condition data can be recorded on the same recording area of the recording sheet without being recorded on the different zone of the recording sheet as in the conventional system. The manner in which the ultrasonic scanning condition data is recorded in any particular position widthwise on the ultrasonic image of the recording sheet can arbitrarily be set under control of the microcomputer relative to the superimposing circuit. Since it is not necessary to sequentially record the aforementioned data in a different time zone on the recording areas in the longitudinal direction of the recording sheet, it is possible according to this invention to periodically record said data in any proper position on the ultrasonic image data.

If the aforementioned data are simultaneously recorded, for example, on VTR with time lapsing indication data recorded on the recording sheet and on VTR, it is easy to obtain a time match therebetween at a later time.

Although this invention has been explained in connection with one embodiment, it is not restricted to the aforementioned embodiment. This invention can be changed or modified in a variety of ways without departing from the spirit and scope of this invention.

What is claimed is:

1. An M mode ultrasonic image recording method comprising the steps of:
   (a) detecting an ultrasonic reception signal from a subject being examined;
   (b) subjecting said ultrasonic signal to image processing and storing an M mode ultrasonic image thus obtained;
   (c) calculating image data from the M mode ultrasonic image thus stored;
   (d) storing, in a digital memory, ultrasonic scanning condition data which represents the scanning parameters in effect when the M mode ultrasonic image is obtained;
   (e) correlating with respect to time the stored ultrasonic scanning condition data with the calculated M mode ultrasonic image data; and
   (f) simultaneously recording both said M mode ultrasonic image data and said ultrasonic scanning condition data on a recording sheet along a length direction thereof, said simultaneous recording being performed so that said M mode ultrasonic image data is recorded only on a specifically designated recording area on said recording sheet along the length direction thereof.

2. The method according to claim 1, wherein said ultrasonic scanning condition data recorded on said recording sheet is so set as to be displayed in a designated position on said ultrasonic image before superimposition on said ultrasonic image.

3. An ultrasonic image recording system comprising:
   means for detecting an ultrasonic reception signal from a subject;
   means for subjecting said ultrasonic signal to image processing and for storing an M mode ultrasonic image thus obtained;
   means for calculating image data from said stored M mode ultrasonic image;
   means for storing, in a digital memory, ultrasonic scanning condition data which represents the scanning parameters in effect when said M mode ultrasonic image is obtained;
   means for setting said stored ultrasonic scanning condition data at a designated position on the M mode ultrasonic image;
   means for simultaneously superimposing said ultrasonic scanning condition data and said calculated M mode ultrasonic image data one over the other so that said M mode ultrasonic image data is recorded only on a specifically designated recording area on said recording sheet along the length direction thereof; and
   means for recording said superimposed M mode ultrasonic image data and said ultrasonic scanning condition data on the same recording sheet.

4. The system according to claim 3, wherein the display of said ultrasonic image, which is recorded on a recording sheet, is restricted to only a specifically designated recording area on said recording sheet, before superimposition on said ultrasonic scanning condition data.

5. The system according to claim 4, wherein a means is provided which sets said ultrasonic scanning condition data, which is recorded on said recording sheet, to a designated position on said ultrasonic image before superimposition on the ultrasonic image.

* * * * *